United States Patent
Newton et al.

(10) Patent No.: US 9,016,139 B2
(45) Date of Patent: Apr. 28, 2015

(54) DETECTION OF AIR FLOW VELOCITY USING FAST FOURIER TRANSFORM AND VORTEX SHEDDING

(71) Applicants: Robert Newton, New Preston, CT (US); Joseph Michael DiBartolo, Baltimore, MD (US); Jerome G. Issa, Norwood, MA (US)

(72) Inventors: Robert Newton, New Preston, CT (US); Joseph Michael DiBartolo, Baltimore, MD (US); Jerome G. Issa, Norwood, MA (US)

(73) Assignee: Accutrol, LLC, Monroe, CT (US)

( * ) Notice: Subject to any disclaimer, the term of this patent is extended or adjusted under 35 U.S.C. 154(b) by 0 days.

(21) Appl. No.: 13/959,889

(22) Filed: Aug. 6, 2013

(65) Prior Publication Data

US 2015/0040684 A1 Feb. 12, 2015

(51) Int. Cl.
*G01F 1/32* (2006.01)
*G01F 1/66* (2006.01)

(52) U.S. Cl.
CPC ..................... *G01F 1/666* (2013.01)

(58) Field of Classification Search
USPC ...................................... 73/861.22
See application file for complete search history.

(56) References Cited

U.S. PATENT DOCUMENTS 4,770,035 A * 9/1988 Kolkebeck et al. ............. 73/195

* cited by examiner

*Primary Examiner* — Jewel V Thompson
(74) *Attorney, Agent, or Firm* — Fay Sharpe LLP

(57) ABSTRACT

A system for detecting velocity airflow in a duct includes a plurality of vortex shedders arranged within the duct for inducing the shedding of vortices at a corresponding plurality of selected locations at a frequencies related to the airflow in the duct and a sound-sensing location on each vortex shedder. A plurality of microphones, each microphone being coupled acoustically with each sound-sensing location senses sounds generated by said shedding of vortices in a corresponding passage and provides an information signal indicative of said vortex shedding sounds. A processing unit performs a Fast Fourier Transform on the information signals to determine frequency of maximum amplitude within the information signals.

8 Claims, 4 Drawing Sheets

DETECTION OF AIR FLOW VELOCITY USING FAST FOURIER TRANSFORM AND VORTEX SHEDDING

BACKGROUND

The present exemplary embodiment relates to the measurement of flow of gases in various systems. It finds particular application in conjunction with detecting air flow velocity using Fast Fourier Transform and vortex shedding, and will be described with particular reference thereto. However, it is to be appreciated that the present exemplary embodiment is also amenable to other like applications.

Currently, air flow velocity measurement utilizes a fluid dynamics concept known as "Vortex Shedding" in order to determine the velocity of air flow within a duct. Specifically, a rigid object of a specific shape is placed within the flow. This object tends to create eddies in the flow as air passes around the object. These eddies create small periodic pressure differences which are transmitted down a plastic tube to a microphone where the energy in the pressure waves is converted to electrical energy by movement of a diaphragm due to air pressure changes. The current electrical hardware takes two microphones wired in anti-phase as an input. The two single-ended microphone signals are then treated as a differential signal, which is essentially band pass filtered by the combination of an AC coupling capacitor and a passive RC low pass filter. The signals are then fed into a differential amplifier where the signals are subtracted. Subsequent circuitry performs peak detection using sample and hold comparison and the result is a set of pulses of varying width which are averaged to produce a signal proportional to the rate of flow. The current electrical hardware configuration does not enable the digital processing of the electrical energy to detect air flow velocity and/or other further analysis. The present application eliminates the need for the current electrical hardware configuration.

The present application provides a new and improved system and method for detecting air flow velocity which overcomes the above-referenced problems and others.

BRIEF DESCRIPTION

In accordance with one aspect of the present exemplary embodiment, a system for detecting velocity airflow in a duct is provided. The system includes a plurality of vortex shedders arranged within the duct for inducing the shedding of vortices at a corresponding plurality of selected locations at a frequencies related to the airflow in the duct and a sound-sensing location on each vortex shedder. A plurality of microphones, each microphone being coupled acoustically with each sound-sensing location senses sounds generated by said shedding of vortices in a corresponding passage and provides an information signal indicative of said vortex shedding sounds. A processing unit performs a Fast Fourier Transform on the information signals to determine frequency of maximum amplitude within the information signals.

In accordance with another aspect, a method of detecting the velocity of airflow is provided. The method includes transmitting sounds generated by shedding of vortices to one or more corresponding microphones, converting the sounds to analog information signals, transmitting the analog information signals to a microcontroller unit, converting the analog signals to digital information signals utilizing an analog to digital converter of the microcontroller, performing a Fast Fourier Transform on the digital information signals to determine the frequency of maximum amplitude of the signal with the microcontroller, and outputting a resulting signal representing the frequency of maximum amplitude of the signal.

One advantage resides in the removal of current analog electrical hardware configuration.

Another advantage resides in measuring air flow velocity by performing a Fast Fourier Transform (FFT) on received electrical signals.

Another advantage resides in providing further digital processing and analysis on received electrical signals.

Still further advantages of the present application will be appreciated to those of ordinary skill in the art upon reading and understand the following detailed description.

The present application may take form in various components and arrangements of components, and in various steps and arrangements of steps. The drawings are only for purposes of illustrating the preferred embodiments and are not to be construed as limiting the present application.

DETAILED DESCRIPTION

The present application measures air flow velocity by performing a Fast Fourier Transform (FFT) on the received single-ended microphone signals after sampling to increase the robustness of the measurement of the flow velocity by determining the frequency of maximum amplitude within the signal. Specifically, the pressure waves sensed by the microphones are highly sinusoidal with relatively pure harmonic content. The frequency of the sinusoid is also linear with the velocity of the air flow. Performing a FFT on the signal after sampling enables a very robust measurement of the flow velocity by determining the frequency of maximum amplitude within the signal. With various levels of external noise and distortion caused by improper microphone bias and large tube length, the fundamental frequency of interest contains the most energy of any frequency within the measurement spectrum for the device under test. Thus, the frequency domain analysis of the signal is more robust and efficient than time domain analysis in terms of the information extracted.

Figure 1:
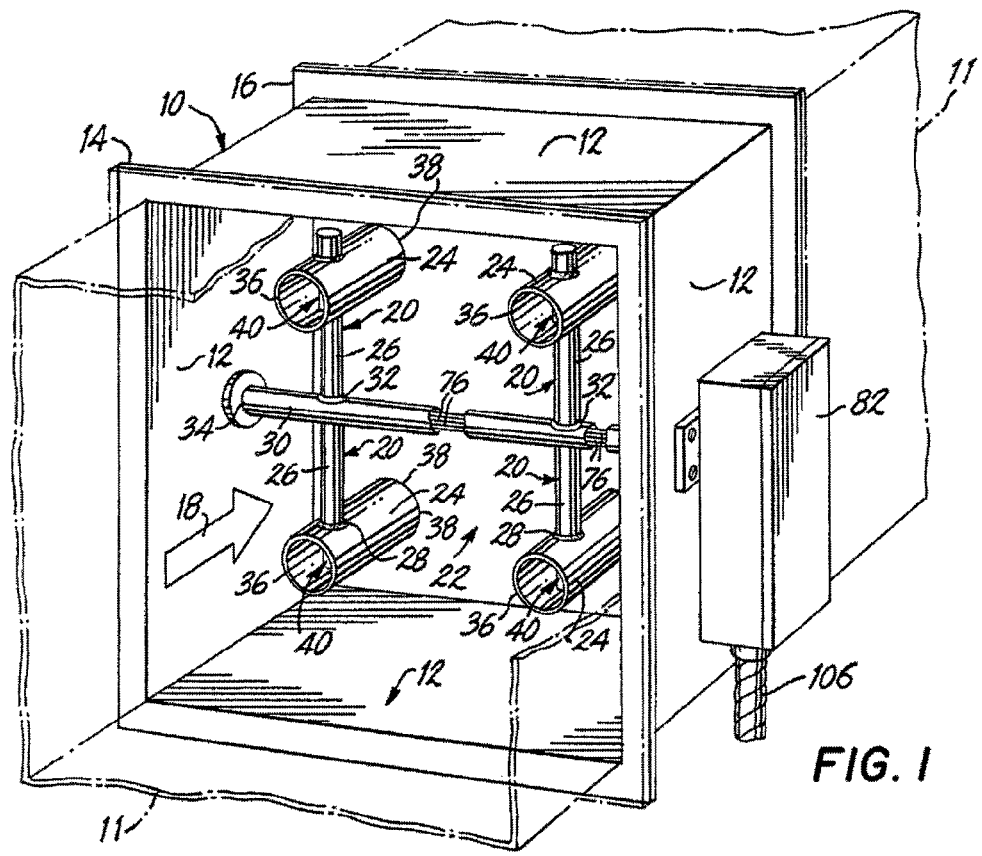
FIG. 1 is a perspective view of a section of a duct within which is installed system in accordance with the present application.

With reference to FIG. 1, a duct section 10 is placed within a typical duct 11 (shown in phantom) in an air-handling system, such as found in a heating, ventilating and air conditioning system of a building. Duct section 10 has a rectangular cross-sectional configuration defined by side walls 12, and includes a forward flange 14 at the forward end of duct section 10 and a rearward flange 16 at the rearward end of duct section 10 for facilitating the placement of duct section 10 within the duct 11 of the air-handling system. The method and system of the present application measures airflow velocity of the air flowing from the forward end toward the rearward end of duct section 10, that is, in the direction of arrow 18, and includes a plurality of probes 20 arranged in an array 22 placed within the stream of air flowing through duct section 10.

Each probe 20 includes a tubular shroud 24 affixed to a tubular stem 26, as by a soldered connection at 28. Each tubular stem 26, in turn, is affixed to a support tube 30, as by a soldered connection at 32. The support tube 30 extends across the duct section 10 and is anchored at each end 34 to a corresponding side wall 12. The illustrated array 22 includes four probes 20 located throughout the cross-sectional area of duct section 10; however, a greater or lesser number of probes 20 may be utilized, as required for a particular installation. Each shroud 24 includes an inlet end 36 facing upstream and an outlet end 38 facing downstream.

Figure 2:
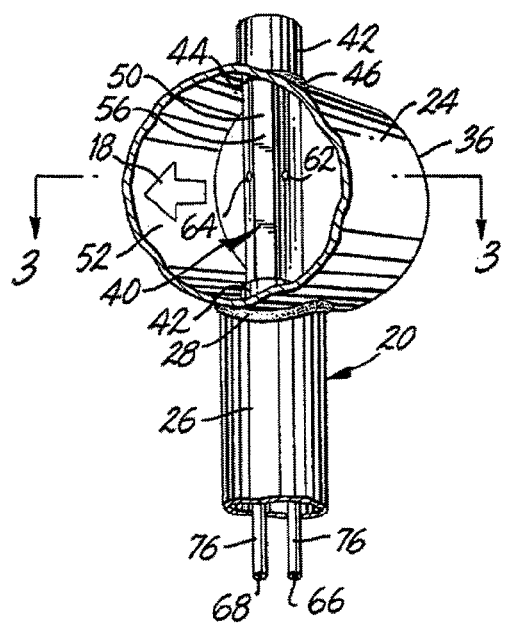
FIG. 2 is a perspective view of a probe assembly of the system of FIG. 1 in accordance with the present application.

With reference to FIG. 2, a shedder bar 40 is placed within the shroud 24 of each probe 20. Shedder bar 40 includes a cylindrical flange 42 at either end thereof and each cylindrical flange 42 is received within a complementary aperture 44 (see FIG. 3) in shroud 24 to locate shedder bar 40 within the shroud 24 such that the shedder bar 40 extends along a diameter of the shroud 24. Shedder bar 40 is secured in place, preferably by a soldered connection at 46. A vortex-shedding segment 50 of shedder bar 40 is located between the cylindrical flanges 42 and extends essentially across the passage 52 defined by the interior of shroud 24.

Figure 3:
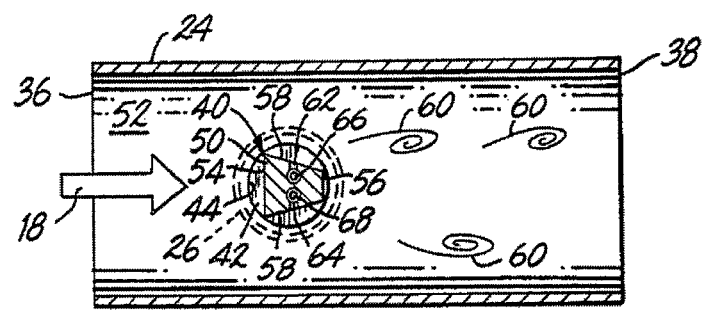
FIG. 3 is us a cross-sectional view of a probe assembly of the system of FIG. 1 in accordance with the present application.

As illustrated in FIG. 3, segment 50 has a trapezoidal cross-sectional configuration including a larger width face 54 facing upstream, a smaller width face 56 facing downstream and opposite sides 58 converging from the larger width face 54 toward the smaller width face 56. The trapezoidal cross-sectional configuration of vortex-shedding segment 50, thus placed in the airstream within the passage 52, induces the generation of vortices 60 which are shed alternately from the sides 58 of segment 50, in a pattern illustrated diagrammatically in FIG. 3. The frequency of this vortex shedding is related to the velocity of the airstream. Therefore, by sensing the frequency of vortex shedding, measurement of the airstream velocity is attained. It has been found that by an appropriate choice of dimensions, the frequency of vortex shedding, over the range of airstream velocities to be measured, can be made to fall within a range of sound frequencies. Thus, by utilizing a shroud 24 having an inside passage 52 with a diameter of about one inch and a shedder bar 40 having a vortex-shedding segment 50 with a larger width face 54 of one-quarter inch width, airstream velocities in the range of 400 to 4000 FPM generate vortex shedding frequencies in the range of about 60 to 6000 Hz. Since these frequencies lie within the audible range, sensing of the vortex shedding frequency is accomplished through the use of a simple microphone.

While acceptable results have been obtained utilizing a single microphone placed either in the shedder bar or in the shroud to sense the frequency of vortex shedding, it has been found advantageous to remove the microphone to a remote location and then couple the microphone acoustically with the passage in the shroud for sensing the vortex shedding frequency. In this manner, the microphone is removed from the vicinity of the airstream and any deleterious effects of temperature, humidity, extraneous matter or vibration present in that vicinity. In addition, removal of the microphone to a remote location enables the sensing site itself to be made smaller and more compact, since the microphone need not be accommodated at that site.

A major problem encountered in determining the vortex shedding frequency by sensing the sound generated by vortex shedding is that other sounds generated in the vicinity of the microphone could cause errors in the output of the system. Thus, while the sounds generated by vortex shedding are "loud" enough at high flow conditions to overcome noises generated by fans in the duct or by other machine noise or by talk among people in the vicinity of the duct, at low flow conditions the sounds generated by vortex shedding are relatively "soft" and, by virtue of a low signal-to-noise ratio, such noises could cause errors in the output of the system. The problem is eliminated by employing two microphones, one which listens to the combined sound of vortex shedding and the unwanted noise and one which listens only to the unwanted noise. The outputs of the two microphones then are subtracted electrically so that the signal common to both (the unwanted noise) is deleted, leaving only the sounds of vortex shedding. In a similar manner, currently available "noise-cancelling" microphones may be employed to eliminate unwanted ambient noise.

Figure 4:
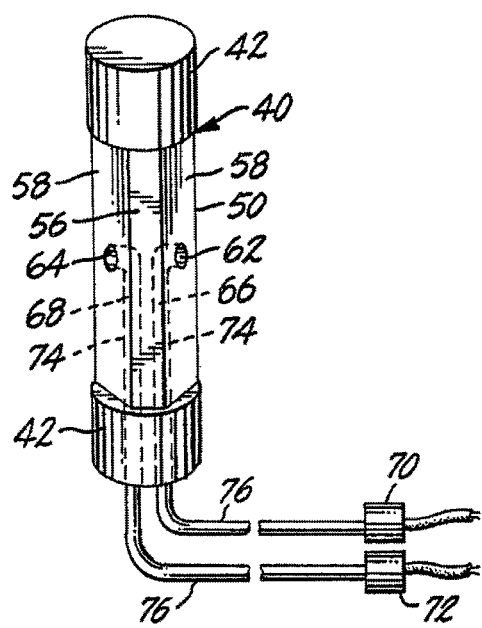
FIG. 4 is a perspective view of a shedder bar of the system in accordance with the present application.

In the configuration of the illustrated embodiment, two remote microphones are utilized, each coupled acoustically to one side 58 of the shedder bar 40. Referring to FIG. 4, as well as to FIGS. 2 and 3, opposite ports 62 and 64 are located in the sides 58 of vortex-shedding segment 50 of shedder bar 40. Hollow conduits 66 and 68 acoustically couple each port 62 and 64 with a corresponding remote microphone 70 and 72. Conduits 66 and 68 each include a passage 74 within the shedder bar 40, and a sound tube 76. As illustrated in FIG. 3, the vortex shedding sounds at each side 58 of the vortex shedding segment 50 are 180 degrees out of phase with one another; hence, upon subtraction of the signal derived from one of the microphones 70 and 72 from the signal derived from the other of the microphones 70 and 72, the signals corresponding to the ambient noises sensed by each microphone are in phase and are deleted, while the out-of-phase signals corresponding to the vortex shedding sounds are retained.

Figure 5:
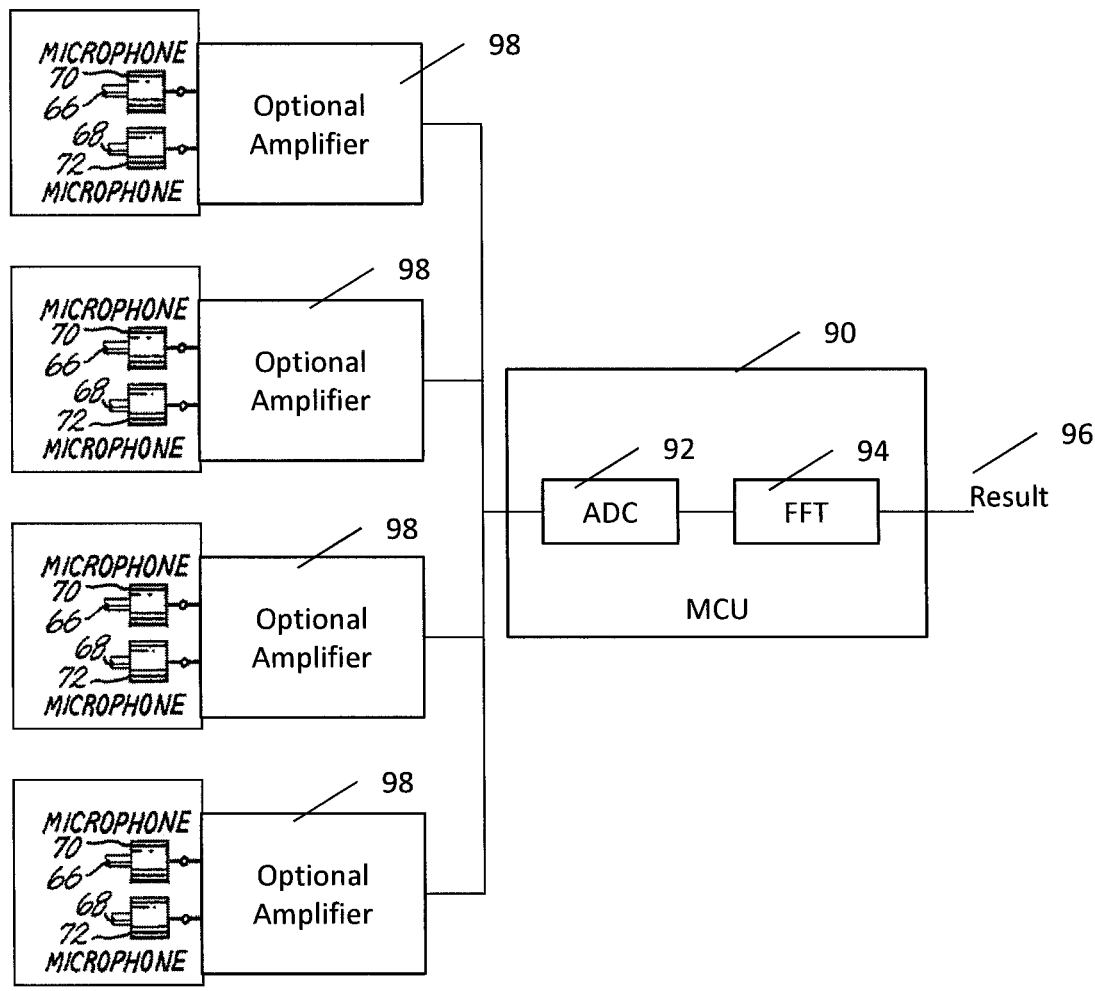
FIG. 5 is a block diagram of the information processing arrangement in accordance with the present application.

With reference to FIG. 5, as well as to FIG. 1, the sound tubes 76 are threaded through each stem 26 of each probe 20 and pass through support tube 30 to be routed to corresponding microphones 70 and 72 which are mounted upon a remote processing unit 80 placed within a housing 82 secured to a side wall 12 of duct section 10. Thus, each port 62 and 64 of each shedder bar 40 is acoustically coupled to a respective microphone 70 and 72 by a corresponding conduit 66 and 68. The processing unit 80 is a part of a processing arrangement which includes electronic components 84 responsive to the output of the microphones to provide the desired information pertaining to airflow, as follows.

Each of the probes 20 of the present application generates a frequency (or pulse) output. The sounds and pressure waved generated by the shedding of vortices at the vortex-shedding segment 50 of a shedder bar 40 are transmitted to corresponding microphones 70 and 72, via conduits 66 and 68, where the sounds are converted to electrical signals forwarded to the processing unit 80 and utilized to measure air flow velocity. As mentioned above, the sound and pressures waves sensed by the microphones are highly sinusoidal with relatively pure harmonic content. The frequency of the sinusoid is also relatively linear to the velocity of the flow. Therefore, performing a FFT on the electrical signal after sampling enables a very robust measurement of the flow velocity. Specifically, by determining the frequency of maximum amplitude, the measurement of flow is calculated. Further, a frequency domain analysis of the electrical signals also provides a more powerful analysis compared to the currently time domain analysis. Specifically, during testing in various conditions with various levels of external noise and distortion caused by improper microphone bias and large tube length, the fundamental frequency of interest contains the most energy of any frequency within the measurement spectrum for the device under test.

Thus, determining the velocity of flow utilizing frequency domain analysis is very robust in that it is clear what the fundamental frequency of the electrical signal is.

Specifically, the electrical signals converted from the sounds generated by the shredding of vortices are forwarded to a microcontroller unit 90 of the processing unit 80. The microcontroller unit 90 samples the electrical signal utilizing an analog to digital converter 92, performs the FFT 94, and determines the resulting frequency of maximum amplitude (measurement of flow velocity) 96. The analog to digital converter 92 includes an appropriate sample rate, linearity, and resolution to provide a sequence of digital values that have converted a continuous-time and continuous-amplitude analog signal to a discrete-time and discrete-amplitude digital signal. Depending on the microphone chosen and the frequency content of the resulting electrical signal, a buffer amplifier 98 with a small amount of gain exceeding 0 db and/or a filtered frequency response is necessary. The buffer amplifier 98 ensures that the loading caused by the analog to digital converter 92 input impedance does not affect the linearity of the electrical signals, that the electrical signal is high enough in amplitude to utilize the maximum resolution of the analog to digital converter 92, and to filter out extraneous frequencies.

The FET unit 94 of the microcontroller unit 90 then performs the FFT on the converted digital signal to determine the frequency of maximum amplitude within the electrical signal. A resulting signal 96 is then output by the microcontroller unit 90 representing the frequency of maximum amplitude of the electrical signal. As mentioned above, the frequency of maximum amplitude of the electrical signal has a linear relationship with the velocity of flow, thus, the resulting signal 96 represents the velocity of flow. The resulting signal 94 can then be input into a controller, indicator, and/or energy management system which utilizes the air velocity measurement. Since most controllers, indicators and energy management systems which utilize air velocity measurements require an input in the form of an analog electronic signal, the resulting signal can be converted into an analog signal utilizing a digital to analog converter.

In another embodiment, the microcontroller unit 90 subtracts the signal derived from one of the microphones 70 and 72 from the signal derived from the other of the microphones 70 and 72, the signals corresponding to the ambient noises sensed by each microphone are in phase and are deleted, while the out-of-phase signals corresponding to the vortex shedding sounds are retained. In other embodiments, the microcontroller unit analyzes and processes the electrical signal to determine other air velocity information.

While all of components of the processing unit 80 were shown as independent components, it is to be appreciated that each of the components can be part of an integrated processing unit 80. At least some of the components of the processing unit 80 each include at least one processor executing computer executable instructions from at least one memory thereof. These components include the microcontroller unit 90 the analog to digital converter 92, the FFT unit 94, and the like. The computer executable instructions embody the functionality of the components and include the applications of microcontroller unit 90 the analog to digital converter 92, the FFT unit 94, and the like. Further, at least some of the components each include a communication unit and/or at least one system bus. A communications unit provides a corresponding processor with an interface to at least one communication network, such as the communication network. A system bus allows the exchange of data between sub-components of the components. Sub-components include processors, memories, communication units, and so on.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like.

Figure 6:
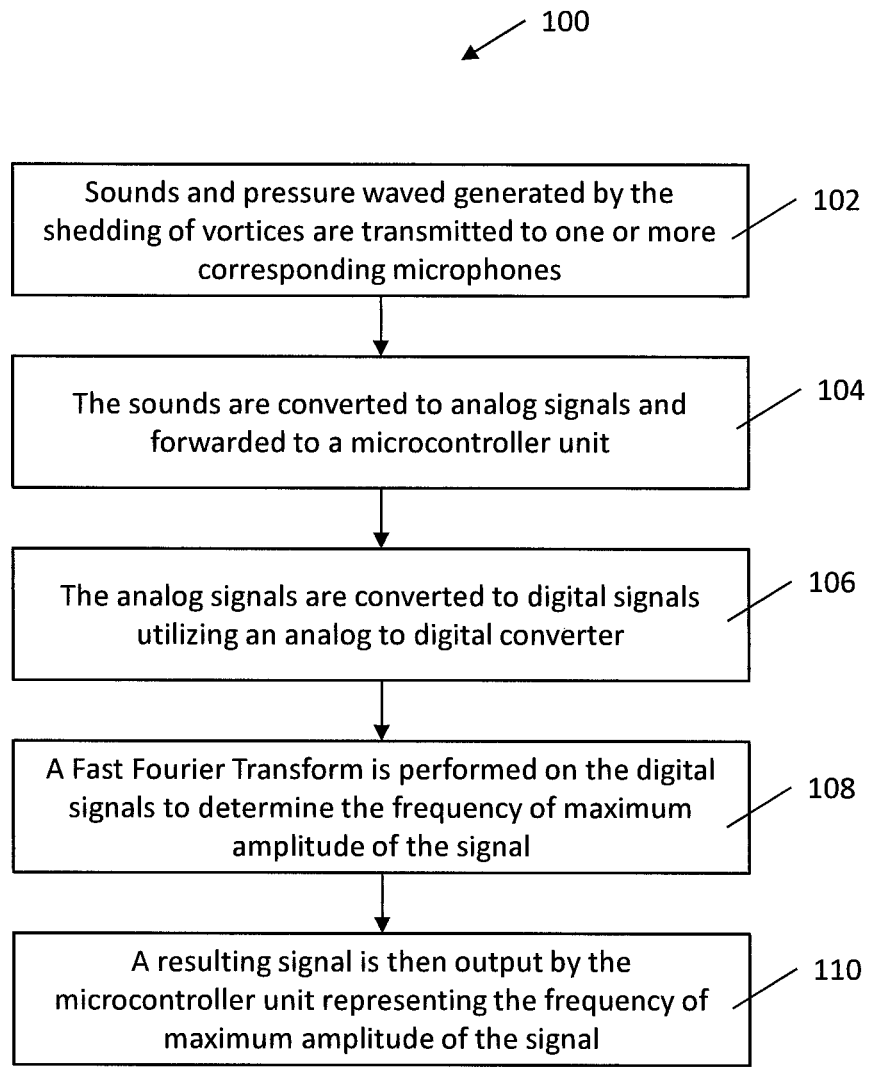
FIG. 6 is a block diagram of a method for detecting air flow velocity in accordance with the present application.

With reference to FIG. 6, a method 100 for detecting air flow velocity is illustrated. In a step 102, sounds and pressure waved generated by the shedding of vortices are transmitted to one or more corresponding microphones. In a step 104, the sounds are converted to analog signals and forwarded to a microcontroller unit. In a step 106, the analog signals are converted to digital signals utilizing an analog to digital converter. In a step 108, a Fast Fourier Transform is performed on the digital signals to determine the frequency of maximum amplitude of the signal. In a step 110, a resulting signal is then output by the microcontroller unit representing the frequency of maximum amplitude of the signal.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system for detecting velocity airflow in a duct, the system apparatus comprising:
    a plurality of vortex shedders arranged within the duct for inducing the shedding of vortices at a corresponding plurality of selected locations at a frequencies related to the airflow in the duct;
    a sound-sensing location on each vortex shedder;
    a plurality of microphones, each microphone being coupled acoustically with each sound-sensing location so as to sense sounds generated by said shedding of vortices in a corresponding passage and provide an information signal indicative of said vortex shedding sounds; and
    a processing unit for performing a Fast Fourier Transform on the information signals to determine frequency of maximum amplitude within the information signals.

2. The system according to claim 1, wherein the frequency of maximum amplitude within the information signals is linearly related to the air flow velocity.

3. The system according to claim 1, wherein the information signals are analog signals and the system further including:
    an analog to digital converter to convert the analog information signals to digital information signals.

4. The system according to claim 3, wherein the Fast Fourier Transform is performed on the digital information signals.

5. The system according to claim 3, wherein the processing unit further includes:

a buffer amplifier for ensuring ensures that loading caused by the analog to digital converter input impedance does not affect the linearity of the information signals.

6. The system according to claim 1, wherein the processing unit outputs a resulting signal representing the velocity of airflow.

7. A method of detecting the velocity of airflow, the method comprising:
- transmitting sounds generated by shedding of vortices to one or more corresponding microphones;
- converting the sounds to analog information signals;
- transmitting the analog information signals to a microcontroller unit;
- converting the analog signals to digital information signals utilizing an analog to digital converter of the microcontroller;
- performing a Fast Fourier Transform on the digital information signals to determine the frequency of maximum amplitude of the signal with the microcontroller;
- outputting a resulting signal representing the frequency of maximum amplitude of the signal.

8. The method according to claim 7, wherein the frequency of maximum amplitude of the signal is linearly related to the velocity of airflow.

* * * * *